Nov. 16, 1948.   C. E. MAYNARD   2,454,194
METHOD FOR MAKING A HOLDER OF PLASTIC MATERIAL
FOR POCKET COMBS AND THE LIKE
Filed Oct. 9, 1946
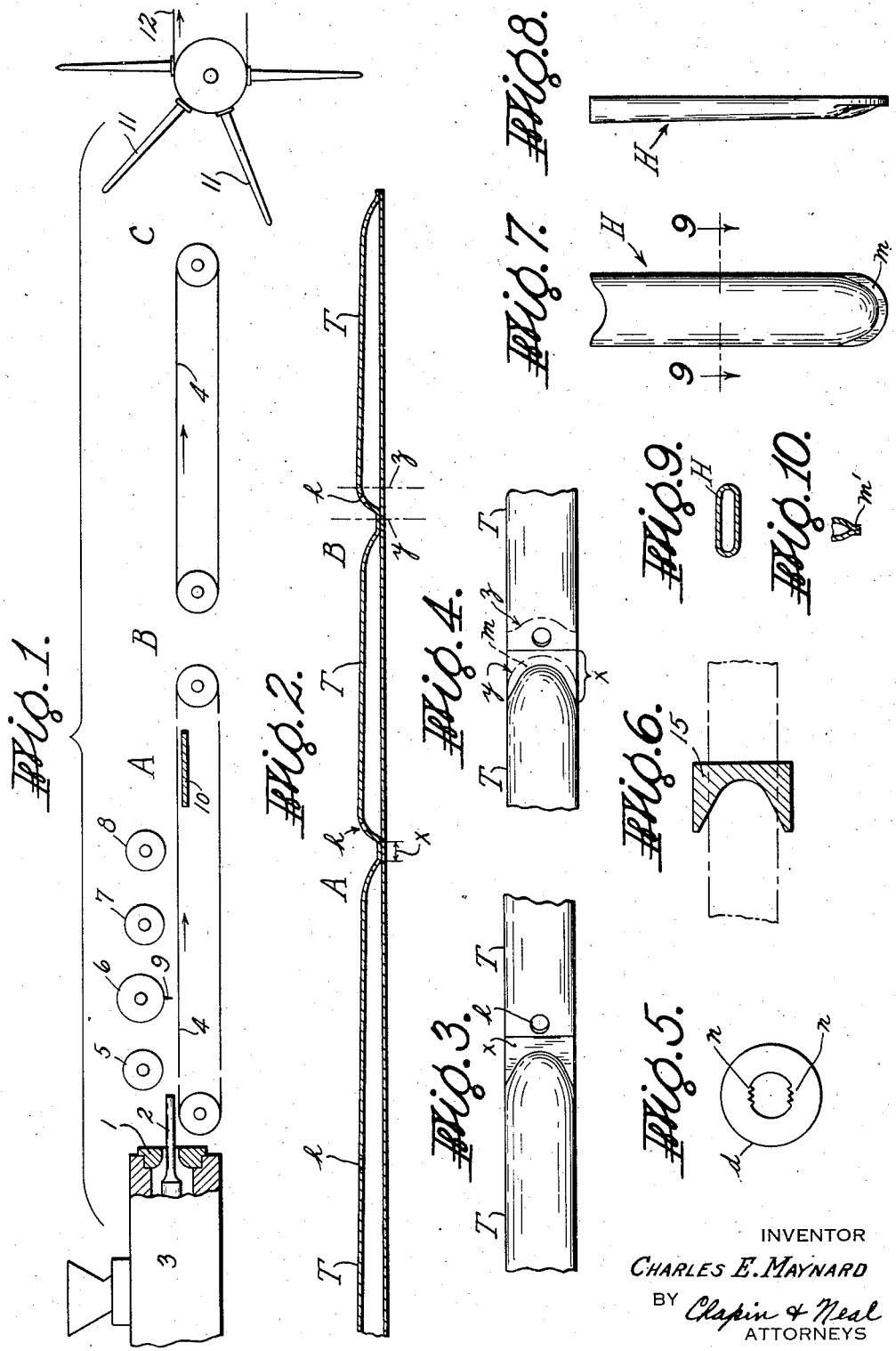
INVENTOR
CHARLES E. MAYNARD
BY Chapin & Neal
ATTORNEYS Patented Nov. 16, 1948

2,454,194

UNITED STATES PATENT OFFICE 2,454,194

METHOD FOR MAKING A HOLDER OF PLASTIC MATERIAL FOR POCKET COMBS AND THE LIKE

Charles E. Maynard, Florence, Mass., assignor to The Pro-Phy-Lac-Tic Brush Company, Florence, Mass., a corporation of Delaware Application October 9, 1946, Serial No. 702,118

1 Claim. (Cl. 18—47.5)

This invention relates to a method for making a holder of plastic material, to contain a pocket comb, spectacles or other articles. The method is particularly useful to make the holder of good quality, of good appearance, and at much less cost than holders have been made prior to my invention.

A routine way to make such a holder of plastic material is to form it of one piece in a mold cavity. To avoid expense of mold equipment and its operation, another routine way is to cut out parts of plastic material and assemble them to form the holder. Both these routine ways are more expensive than my new method.

The invention will be disclosed, by way of example, with reference to a pocket comb holder. The comb holder to be made is one with a shaped cavity therein to contain the comb. The holder has one end open. The open end preferably has two parallel opposite notches to give quick finger access to the comb. All sides of the holder except one are closed. The holder is made of any plastic material in the class of plastics which is preferably stiff enough when set, to hold substantially the same shape whether the comb is in, or not in, the holder. In this sense the holder form is as if it were made in a shaping mold.

Referring to the drawings:

Fig. 1 indicates in diagram form an arrangement of a machine for tubing hot plastic material and of a conveyer means for carrying the tube product past work stations;

Fig. 2 indicates in section the progress of a continuous tube of the plastic material from the tubing machine up to the place to cut off a comb holder from the tube at the delivery end.

Figs. 3 and 4 are top views of two portions of the tube of Fig. 2 to indicate the nature of the work at two stations along the conveyer of Fig. 1;

Fig. 5 indicates a form of tubing die;

Fig. 6 indicates a cross sectional view of one of the tools;

Figs. 7, 8 and 9 indicate front, side and sectional views of a finished comb holder; and Fig. 10 indicates a modified detail in the form of a finished comb holder.

An example for practicing the new method will be seen from considering these figures in sequence.

Hot plastic material is extruded in tube form from the tubing die 1, with mandrel 2, in machine 3. A suitable material is poly-ethy-lene, known also by its trade name polythene. It is only one of many suitable plastic materials of decorative character. The machine 3 is of the general nature as the type illustrated on page 564 of "Handbook on Plastics" published by D. Van Nostrand Inc. of New York in 1943. It is a known machine that will produce tubing continuously as long as it is kept in operation.

The tube T, Fig. 2, as formed is received on conveyer 4. As it leaves mandrel 2 it is supported in hollow tube form and carried away by the conveyer to successive work stations. The thickness of the tube wall, considered with the nature of the hot plastic material, is enough to avoid quick collapse from full tube to flattened tube form. The idea is to provide for a gradual flattening movement of the tube form to comb holder form in cross section, as the material moves away from the mandrel 2. During this movement and change of cross section, the material is gradually cooling. The plan is to work on the hot partially flattened tube at a succession of work stations, along side the conveyer 4.

Work station A is a place where the partially flattened tube has its top and bottom sides completely flattened and heat sealed at spaced portions or intervals of length. The sides are pressed completely together crosswise and lengthwise, for enough length to provide a closed end for a comb holder and for a piece to cut out to give rounded shape to the closed end. This is indicated in Figs. 2 and 3. Such short length flattening step at station A is repeated on successive small portions of tubing as it passes by on the conveyer 4. The length of tubing between each two flattening and heat sealing steps is enough for one comb holder. It is desirable to have the tubing at a predetermined stage of its change from hot to cold form, when the short step at station A is performed. Station A may be spaced just the right distance from machine 3 so the tube will reach such predetermined stage, as by its gradual flattening and cooling step. But to ensure a predetermined cross sectional form at station A, a few rollers, 5, 6, 7 and 8, bearing on the tube from axes fixed progressively nearer to the conveyer as indicated, will ensure the desired result and permit the position of station A to be on the safe side for its work.

The step at station A closes the tube between that station and the machine 3 so air can not get out. When this interferes with the gradual tube flattening action up to station A, a hole pricker pin 9, on a special roller 6 for example, will provide for letting the air out. This hole pricker roll 6 preferably has a circumference positioned to work on the material of the tube and mark off by holes $h$ serving to mark off the length between spaced portions, see Fig. 2, which are to be flattened at station A.

The walls of the tube are heat sealed over the area indicated at X in Fig. 3. The conveyer 4 may serve as a traveling flat endless table with a firm support 10 under the traveling table at station A. A hand tool 15 for pressing the area X may be applied with enough force to heat seal the top and bottom tube walls using the heat in the tube for this purpose. The plastic material will be hot enough for the heat sealing step, to bond the walls tightly together for a permanent seal. The tool should be applied to avoid relative movement lengthwise of the tube. That is, it preferably travels with the tube as it contacts to press down on the area X. A section of a suitable tool is indicated in Fig. 6, to press down the area X of Fig. 3, at station A of Fig. 1.

When the sealed area X reaches the station B, the tube is cut by scissors, a suitable cutting die or other cutting means. At this station B of Fig. 1 conveyer 4 may have one section end and another begin, with a short gap between for the working of the cutting tool, as indicated in Fig. 1. As in the sealing and forming operations at station A, the cutting tool may be operated by hand. It is preferable to do the cutting without interfering with the traveling tube material beyond its cutting action. This can be done by moving the cutting tool with the material. At the cutting station B the material of the tube is in condition, that is preferably cooled enough, not only for cutting but for making clean cuts along lines y and z, Fig. 4. The line z is enough on one side of the sealed area X to open up the tube, to make the open end for the comb holder. The line y is enough within the area X to make the closed end for the comb holder. This end is preferably rounded or decoratively shaped and carries a narrow margin m taken from area X to give good form to the closed end. The material of the tube between cutting lines y and z is by-product material but not waste. It is put back in machine 3 to come out again as tube material and there is no waste.

When the comb holders are formed in succession and are ready to leave station B, they may be still warm. In some cases they may be still warm enough so that they will shrink enough before the cooling ends, for another step. This is to shrink them on hard cores 11 of predetermined dimensions to give duplicate dimensions for the cavity of the comb holders. This step is indicated by the cores or formers arranged on a conveyer at the end work station C, of Fig. 1 arrangement. Each comb holder is taken from the cutting step of station B by conveyer 4 to station C and put on a former. They are carried for a long enough time by the conveyer 12 for the holders to fully cool, shrink and set to predetermined cavity dimensions on the formers. Then they are taken off the formers and are finished.

In some cases, for one reason or another, as for example due to a particular plastic material being used, or due to a particular set up for the stepped operations, the comb holders may be too much cooled off for the final shrinkage step to predetermined cavity dimensions on formers 11. In such cases I introduce an intermediate step of warming up the comb holders finished at station B, as in an oven not shown, before they go on the formers at station C.

For some products the step of station C may not be used but it is a desirable step for better quality, the uniform duplication of exact dimensions. It is a step of little cost. It is preferred to make use of this final step as it relates to and fits in with the idea of the other steps in making the product of high quality; it helps insure uniformity in the mass production of good holders at a very low cost.

The finished form of the comb holder H in the example of the way to practice the method, is indicated in Figs. 7, 8 and 9. When a holder for spectacles, or another article is desired, the finished holder form will be one to fit the article. The holders of the invention are especially useful under the circumstances, as with comb holders, when good appearance and quality are much desired but usually cost too much and cheap appearance and quality have resulted in prior art ways of getting holders made at a low cost to the user. The finished comb holder resulting from the method can be made at a remarkably low cost.

The method is adapted to add decorative features in the product when desired at no additional cost. This is indicated by the modified form of a tubing die $d$ seen in Fig. 5. The three notches $n$ at the top and the bottom of its opening will form three decorative strips on both faces of the holder. It is also indicated in Fig. 10 by the modified form of heat sealed margin $m'$. The method being adapted for "no cost" features of decorating the holder as indicated is of course more useful in this respect than prior methods of making a holder for analogous uses.

Considering the product as indicated in Figs. 7, 8 and 9 it will be understood that it is made in one piece of decorative plastic. Its open cavity has a shape of predetermined form, to fit the article just loosely enough for most convenient use. When a holder of its class is made according to the method of this invention, it can be sold at a small fraction of the price customarily charged for holders of its type.

A useful form of apparatus unit to perform the work of the method disclosed herein will be disclosed and claimed in another application. It will be apparent from the present disclosure that the method may be practiced with no more apparatus than an extrusion machine of a known type in the plastic art to make tube plastic material of the ornamental kind and a conveyer to carry the tubing away from the extrusion machine. The several operations to make the holders from the tubing machine can be hand operations performed by hand tools. Regarding the point that the tools should not be used to permit the moving material to pile up against their sides, it is simple for the hand to move the tool along as the material moves along with the conveyer. The area X could be pressed in for the heat sealing step by a suitable clamp, not shown, fastened on the material to travel with it a short way. The cutting could be done by scissors moved along with material. Of course the better way is to use a factory production machine but this is to be disclosed in another application.

Having disclosed the method, the claim for the method is:

The method of making pocket comb holders, which consists in continuously extruding hot thermo-plastic material as a coreless hollow tube and with a wall thickness to support the tube enough for only gradually and progressively moving toward tube collapsed condition while hot, the thermo-plastic material being extruded in condition and slowly enough for setting by cooling to retain its shape when partially collapsed for internally fitting a comb, pinching the tube form together to completely collapse it to provide for end closures of the pocket comb holders, piercing the tube at intervals of its length to vent it against internal air pressure, setting the tube material in successive portions, and cutting off lengths formed for the comb holders as stated.

CHARLES E. MAYNARD.

REFERENCES CITED

The following references are of record in the file of this patent:

UNITED STATES PATENTS

| Number | Name | Date |
| --- | --- | --- |
| 2,044,961 | Waner | June 23, 1936 |
| 2,121,966 | Jacobson | June 28, 1938 |
| 2,172,899 | Barnard | Sept. 12, 1939 |

Certificate of Correction

Patent No. 2,454,194.
November 16, 1948.

CHARLES E. MAYNARD

It is hereby certified that the name of the assignee in the above numbered patent was erroneously described and specified as "The Pro-Phy-Lac-Tic Brush Company" whereas said name should have been described and specified as *Pro-Phy-Lac-Tic Brush Company*, as shown by the record of assignments in this Office; and that the said Letters Patent should be read with this correction therein that the same may conform to the record of the case in the Patent Office.

Signed and sealed this 8th day of March, A. D. 1949.

[SEAL]

THOMAS F. MURPHY,
*Assistant Commissioner of Patents.*